United States Patent [19]

Deveney et al.

[11] 4,454,934

[45] Jun. 19, 1984

[54] ROTATABLE STEM AND LOCK

[75] Inventors: Joseph E. Deveney; Stephen N. Sanderson, both of Albuquerque, N. Mex.

[73] Assignee: The United States of America as represented by the United States Department of Energy, Washington, D.C.

[21] Appl. No.: 315,377

[22] Filed: Oct. 27, 1981

[51] Int. Cl.³ .............................................. B60T 13/04
[52] U.S. Cl. ..................................... 188/171; 188/265; 251/89
[58] Field of Search ................. 188/67, 163, 171, 265; 251/89, 129, 138–141

[56] References Cited

U.S. PATENT DOCUMENTS 3,198,293  8/1965  Mathews .......................... 188/171 X
3,812,936  5/1974  Dane .................................... 188/171

Primary Examiner—Duane A. Reger
Attorney, Agent, or Firm—George H. Libman; Albert Sopp

[57] ABSTRACT

A valve stem and lock include a housing surrounding a valve stem, a solenoid affixed to an interior wall of the housing, an armature affixed to the valve stem and a locking device for coupling the armature to the housing body. When the solenoid is energized, the solenoid moves away from the housing body, permitting rotation of the valve stem.

6 Claims, 3 Drawing Figures

ROTATABLE STEM AND LOCK

The United States Government has rights in this invention pursuant to Contract No. DE-AC04-76DP00789 between the Department of Energy and Sandia Corporation.

BACKGROUND OF THE INVENTION

The present invention relates generally to the combination of a rotatable stem and a lock therefore, and more particularly to a valve stem having an electromechanical lock to control the manual rotation of the stem.

There are many applications where it is desirable to prevent the unauthorized manual actuation of a rotatable stem. For example, in a nuclear reprocessing facility the manual actuation of valves at the wrong time as a result of accident or sabotage could endanger both material and workers. Accordingly, it is desirable to provide remotely controlled locks on each valve whereby a remote operator or central computer control can enable the valve for manual operation only at a proper time as determined from a schedule. These valve locks should be installable on both new valves and on existing valves to which access is limited to the valve stem coming through the panel of an installation.

A related prior valve is shown in U.S. Pat. No. 3,463,445 Churchill et al. In this patent, longitudinal motion of a valve is provided by longitudinal motion of a handle when a solenoid controlled connection between the handle and valve causes a wedging action to occur. The patent is distinguished from the invention by the type of motion required to open the valve and a design which does not directly couple the handle to the valve.

SUMMARY OF THE INVENTION

It is an object of this invention to provide a remotely actuatable lock for a manually rotatable valved stem.

It is another object of this invention to provide a lock which may be added on to an existing valve stem.

Additional objects, advantages and novel features of the invention will become apparent to those skilled in the art upon examination of the following description or may be learned by the practice of the invention. The objects and the advantages of the invention may be realized and obtained by means of the instrumentalities and combinations particularly pointed out in the appended claims.

To achieve the foregoing and other objects and in accordance with the purpose of the present invention, as embodied and broadly described herein, the invention may comprise a round stem which is either integral with a device operable by rotating motion of the stem or which is attachable to the existing stem of such device. A free end of the stem includes a handle for manual rotation of the stem, and the remainder of the stem is enclosed by a cylindrical housing including an end cap near the handle and a wall structure which extends from the cap to supporting structure of the equipment to which it is attached. A solenoid is affixed to an interior surface of the wall. An armature is coupled to the stem opposite the solenoid for rotation with the stem by means that permit longitudinal movement of the armature with respect to the stem from a first position when the solenoid is energized to a second position when the solenoid is not energized. The armature includes locking devices for preventing rotation of the stem when the armature is in one position, and for permitting rotation of the stem when the armature is in the other position. The locking device includes at least one projecting member on either the housing or armature, and a hole on the other of the housing or armature for receiving the projecting member when the armature is in the other position. The locking device includes at least one projecting member on either the housing or armature, and a hole on the other of the housing or armature for receiving the projecting member when the armature is in the one position.

BRIEF DESCRIPTION OF THE DRAWINGS

The accompanying drawings, which are incorporated in and form a part of the specification, illustrate an embodiment of the present invention and, together with the description, serve to explain the principles of the invention.

DETAILED DESCRIPTION OF THE INVENTION

Figure 1:
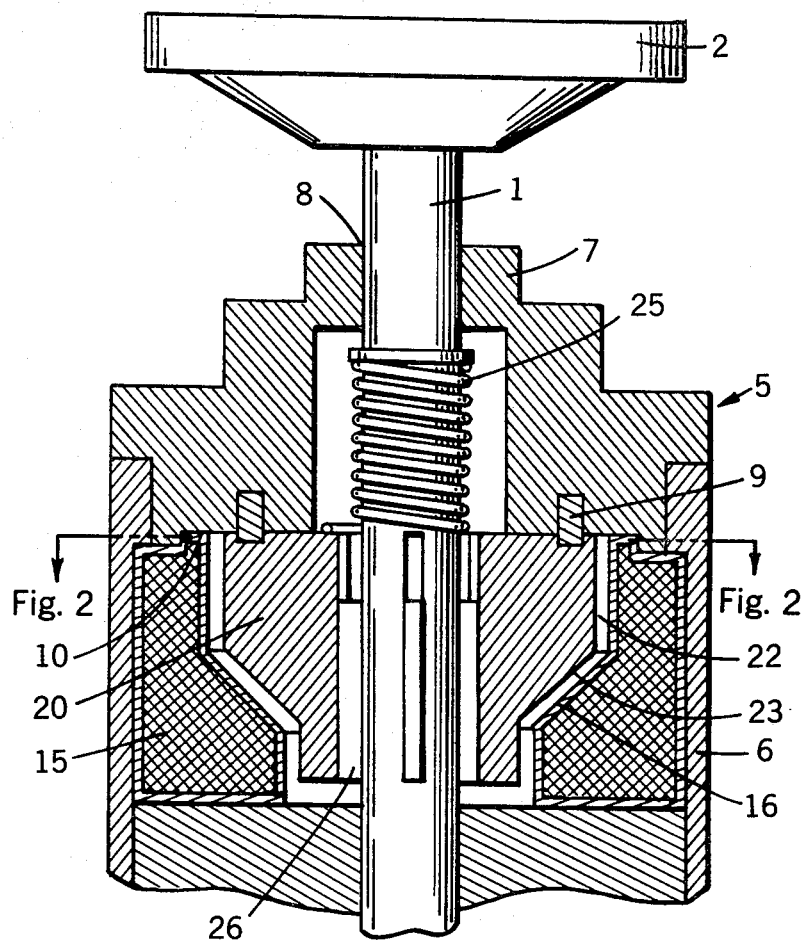
FIG. 1 is a longitudinal cross-section of the invention showing the locking device engaged.

As shown in the figures, the invention includes a stem 1 having a handle 2 at one end. The other end of stem 1 is either affixed rigidly to the stem of an operator to be controlled by rotary motion (such as a valve or a switch) or extends directly to the operator. Stem 1 is surrounded by a housing 5 which includes end cap 7 having aperture 8 for the passage of stem 1 and a cylindrical wall 6 extending from cap 7 to the surface of the operator. Although the details are not part of the invention and are not shown in this description, it should be understood that wall 6 could either form part of the enclosure of the operator or, alternatively, could be affixed to the body of an operator to which the invention is attached.

An electrically actuated solenoid 15 is located within housing 5 and affixed to an interior surface of wall 6. Electrical means for energizing the solenoid in accordance with well-known procedures are provided but not illustrated. In the preferred embodiment of the invention shown in the figures, the outer surface of solenoid 15 forms a cylinder contiguous with the wall's interior surface. The interior surface of solenoid 15 includes a portion 16 having a radial component. This portion 16 may be transverse to the longitudinal axis of stem 1 or, alternatively, may include both radial and longitudinal components as shown in the figure.

To react with solenoid 15, an armature 20 encircles stem 1. In the preferred embodiment shown, armature 20 includes an outer diameter 22 which corresponds with, but is slightly smaller than, the inner diameter of solenoid 15, thereby providing clearance for movement of armature 20 relative to solenoid 15. The outer diameter of armature 20 includes radial component 23 which reacts with radial component 16 when solenoid 15 is energized.

Figure 2:
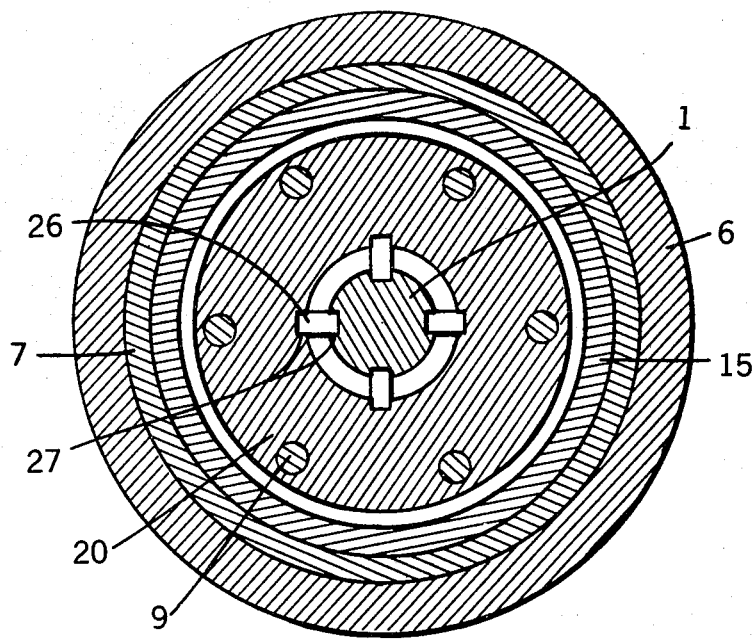
FIG. 2 is a sectional view of a portion of FIG. 1.

As best shown in FIG. 2, the invention includes structure for encoupling armature 20 to stem 1. This structure prevents armature 20 from rotating with respect to stem 1 and permits the armature to slide longitudinally along the stem.

In the preferred embodiment, the coupling structure includes at least one pair of longitudinal keyways 27 extending into both armature 20 and stem 1, and at least one corresponding key 26 connecting the keyways. Of course, it is contemplated that the invention could also have at least one keyway extending into either one of stem 1 or armature 20, and that key 26 can be an integral rib extending from the other of stem 1 or armature 20.

The invention also includes a locking structure for preventing rotation of stem 1 when armature 20 is in one of the energized or de-energized positions and for permitting rotation of stem 1 when armature 20 is in the other of its energized or de-energized positions.

In the preferred embodiment, the locking structure includes at least one projecting member 9 extending from interior surface 10 of cap 7. As shown in FIG. 2, a plurality of projecting members 9 may be arranged in a circle concentric to the axis of stem 1.

Armature 20 has a surface 24 opposing interior surface 10 of cap 7. To complete the locking structure, this surface 24 includes a plurality of apertures 21 arranged to receive projecting members 9.

The preferred embodiment of the invention further includes a spring for resiliently urging the armature to its de-energized position. In the illustrated embodiment, coil spring 25 encircles and is affixed at one end to stem 1 and at the other end to armature 20. The spring could be eliminated if the invention were oriented so that gravity would move armature 15 to the de-energized position.

The operation of the invention is as follows. Stem 1 is either an integral part of, or is affixed to, the stem of a valve. With solenoid 15 de-energized, the invention is in the configuration of FIG. 1, wherein spring 25 forces armature 20 to the de-energized position with surface 24 contacting the interior surface 10 of cap 7 and projecting members 9 fitting into apertures 21. Should an attempt be made to manually turn handle 2, stem 1 is found to be rigidly fastened to housing 5 through the interaction of key 26 and keyway 27 between stem 1 and armature 20 and the connection of armature 20 to end cap 7 through projecting members 9.

Figure 3:
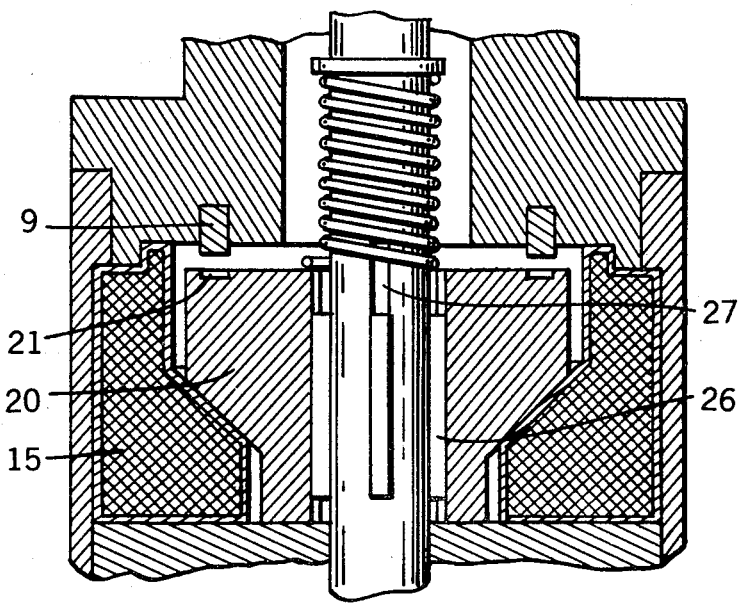
FIG. 3 is a longitudinal cross-section view of a portion of the invention showing the locking means disengaged.

When it is desired to permit the rotation of stem 1, a remotely controlled signal energizes solenoid 15 and overcomes the force of spring 25, moving armature 20 to the position shown in FIG. 3. Key 26 and keyway 27 permit armature 20 to slide along stem 1 and contact aperture 15. Surface 24 is now spaced from end cap 7, allowing apertures 21 to be clear of projecting members 9. At this time, manual rotation of handle 2 is opposed only by the friction inherent in the valve or operator and the sliding friction between armature 20 and solenoid 15, permitting the valve to be actuated. After rotation of stem 1 is completed, de-energizing solenoid 15 permits spring 25 to pull armature 20 back against end cap 7 thereby engaging projecting members 9 in apertures 21 and locking the stem.

In a typical use of the invention in a nuclear processing plant, a valve which controls the flow of plutonium nitrate solution has a stem accessible to an operator through a radiation-shielding control panel. To prevent an accidental or intentional opening or closing of the valve at an improper time, housing 5 of the invention is fastened to the control panel with stem 1 fastened to the valve stem. The valve is now locked against manual operation unless a remote operator or computer control system energizes the solenoid.

The particular sizes and equipment discussed above are cited merely to illustrate a particular embodiment of the invention. It is contemplated that the use of this invention may involve different arrangements of the claimed components which perform the same functions as the embodiment shown. For example, the locking structure could include projections on the armature and apertures on the housing. In addition, other spring arrangements that bias the armature are easily foreseen, and a small change can easily require the solenoid to be energized to lock the stem. It is intended that the scope of the invention be defined by the claims appendent hereto.

We claim:

1. A stem assembly including an electro-mechanical lock comprising: a round stem including handle means at one end for manual rotation of said stem; a cylindrical housing including wall means for surrounding said stem and a cap at one end adjacent said handle having an aperture for passage of said stem; solenoid means for generating a magnetic field, when energized, fastened to an interior surface of said wall means; armature means for reacting with said solenoid encircling said stem; means for coupling said armature for rotation with said stem, said means permitting longitudinal movement of said armature with respect to said stem from a first position when said solenoid is energized to a second position when said solenoid is not energized; and locking means comprising at least one projecting member on one of said armature or said housing means, and at least one aperture on the other of said armature or said housing means for receiving said projecting member when said armature is in one of the first or second positions, said projecting member being clear of said armature when said aperture is in the other of said first or second positions.

2. The stem assembly of claim 1 further including spring means for resiliently urging said armature to the second position, the reaction of said armature to said energized solenoid being of sufficient magnitude to overcome the force of said spring and move said armature to the first position.

3. The stem assembly of claim 2 wherein said locking means prevents rotation of said stem when said armature is in the second position.

4. The stem assembly of claim 3 wherein said coupling means comprises at least one longtudinal keyway extending into one of said armature or said stem and at least one rib extending from the other of said armature or said stem and into said keyway.

5. A stem assembly including an electro-mechanical lock comprising: a round stem including handle means at one end for manual rotation of said stem; a cylindrical housing including wall means for surrounding said stem and a cap at one end adjacent said handle having an aperture for passage of said stem; solenoid means for generating a magnetic field, when energized, fastened to an interior surface of said wall means, the outer surface of said solenoid forming a cylinder contiguous with the interior surface of said wall means, the inner surface of said solenoid including a portion having a radial component, armature means for reacting with said solenoid encircling said stem and having an outer surface including a portion having a similar radial component, said surfaces of said housing and armature contacting when said solenoid is energized; means for coupling said armature for rotation with said stem, said means permitting longitudinal movement of said armature with respect to said stem from a first position when said solenoid is energized to a second position when said solenoid is not energized; and locking means for preventing rotation of said stem when said armature is in one of said first or second positions and permitting rotation of said stem when said armature is in the other of said positions.

6. The stem assembly of claim 1 wherein said locking means further comprises a plurality of projecting members extending from an interior surface of said cap, and said armature has an opposing surface including a plurality of apertures.

* * * * *